United States Patent [19]

Hendry

[11] Patent Number: 5,098,637
[45] Date of Patent: * Mar. 24, 1992

[54] PROCESS FOR INJECTION MOLDING AND HOLLOW PLASTIC ARTICLE PRODUCED THEREBY

[75] Inventor: James W. Hendry, Brooksville, Fla.

[73] Assignee: Milad Limited Partnership, Naples, Fla.

[*] Notice: The portion of the term of this patent subsequent to Jul. 2, 2008 has been disclaimed.

[21] Appl. No.: 217,175

[22] Filed: Jul. 11, 1988

[51] Int. Cl.$^5$ .................. B29C 45/00; B29C 45/34; B29D 22/00
[52] U.S. Cl. .................. 264/572; 264/328.7; 264/328.8; 264/328.12; 264/328.13
[58] Field of Search .................. 264/101, 102, 328.1, 264/537, 572, 85, 500, 328.7, 328.8, 328.12, 328.13; 425/130, 812; 215/1 C; 428/35.7, 36.9, 36.92, 166, 188

[56] References Cited

U.S. PATENT DOCUMENTS

| | | |
|---|---|---|
| 2,331,688 | 10/1943 | Hobson . |
| 2,345,144 | 3/1944 | Opavsky . |
| 2,714,747 | 8/1955 | Lindemann et al. . |
| 2,714,748 | 8/1955 | Stirnemann et al. . |
| 3,021,559 | 2/1962 | Strong . |
| 3,044,118 | 7/1962 | Bernhardt et al. ............ 264/85 |
| 3,135,640 | 6/1964 | Kepka et al. . |
| 3,687,582 | 8/1972 | Hendry et al. . |
| 3,966,372 | 6/1976 | Yasuike et al. . |
| 4,033,710 | 7/1977 | Hanning . |
| 4,078,875 | 3/1978 | Eckardt . |
| 4,082,226 | 4/1978 | Appleman et al. . |
| 4,091,057 | 5/1978 | Weber . |
| 4,092,389 | 5/1978 | Sakurai . |
| 4,101,617 | 7/1978 | Friederich . |
| 4,106,887 | 8/1978 | Yasuike et al. . |
| 4,129,635 | 12/1978 | Yasuike et al. . |
| 4,136,320 | 1/1979 | Olabisi . |
| 4,140,672 | 2/1979 | Kataoka . |
| 4,234,642 | 11/1980 | Olabisi . |
| 4,247,515 | 1/1981 | Olabisi . |
| 4,333,608 | 6/1982 | Hendry . |
| 4,357,296 | 11/1982 | Hafele . |
| 4,474,717 | 10/1984 | Hendry . |
| 4,555,225 | 11/1985 | Hendry . |
| 4,601,870 | 7/1986 | Sasaki . |
| 4,604,044 | 8/1986 | Hafele . |
| 4,740,150 | 4/1988 | Sayer . |
| 4,781,554 | 11/1988 | Hendry . |

FOREIGN PATENT DOCUMENTS

| | | |
|---|---|---|
| 309182 | 3/1989 | European Pat. Off. . |
| 309257 | 3/1989 | European Pat. Off. . |
| 321117 | 6/1989 | European Pat. Off. . |
| 651725 | 3/1937 | Fed. Rep. of Germany . |
| 2106546 | 8/1972 | Fed. Rep. of Germany . |
| 3444532 | 6/1986 | Fed. Rep. of Germany . |
| 5714968 | 6/1975 | Japan . |
| 1460101 | 12/1976 | United Kingdom . |
| 1487187 | 9/1977 | United Kingdom . |
| 2139548 | 11/1984 | United Kingdom . |

Primary Examiner—Leo B. Tentoni
Attorney, Agent, or Firm—Brooks & Kushman

[57] ABSTRACT

A process for injection molding hollow plastic articles includes the steps of sequentially injecting fluent plastic and gas into a mold cavity. A quantity of fluent plastic is initially injected to substantially fill the mold cavity. A charge of pressurized gas is then injected into the mold cavity to displace a portion of the still fluent plastic into a spill cavity flow coupled to the mold cavity. The article may be formed with an internal wall by introducing first and second gas charges into the mold cavity at separate entry points. In one embodiment, the first and second charges are introduced substantially simultaneously. In a second embodiment, the charges are introduced sequentially. After the hollow plastic article has solidified, the gas is vented.

9 Claims, 5 Drawing Sheets

PROCESS FOR INJECTION MOLDING AND HOLLOW PLASTIC ARTICLE PRODUCED THEREBY

TECHNICAL FIELD

This invention relates to plastic injection molding and articles produced thereby, and, more particularly, to plastic injection molding and plastic articles having hollow interior portions produced thereby.

CROSS REFERENCE TO RELATED APPLICATIONS

This application is related to U.S. patent applications entitled "Apparatus and Method for the Injection Molding of Thermoplastics", Ser. No. 071,363 filed July 9, 1987 now U.S. Pat. No. 4,781,554; Method and Apparatus for the Injection Molding of Plastic Articles", Ser. No. 098,862 filed Sept. 21, 1987 and now U.S. Pat. No. 4,855,094 and "Method and System for Localized Fluid-Assisted Injection Molding and Body Formed Thereby", Ser. No. 133,900, filed Dec. 16, 1987 which has been refiled as Ser. No. 351,271 on May 10, 1989, all of which have the same Assignee as the Assignee of the present invention and all of which are hereby expressly incorporated by reference.

BACKGROUND ART

In the plastic injection molding art, the usual challenges facing a product designer is to design an article having requisite strength for the product application and uniform surface quality for satisfactory appearance, but to avoid excessive weight, material usage and cycle time. A design compromise must often be made between strength and plastic thickness. A relatively thicker plastic section in the article, such as a structural rib, will incur greater weight, material usage, cycle time and induce sink marks and other surface defects due to thermal gradients in the area of the thickened section.

It is known in the plastic molding art to use pressurized fluid in conjunction with the plastic molding of articles. The pressurized fluid is typically nitrogen gas which is introduced into the mold cavity at or near the completion of the plastic injection. The pressurized fluid serves several purposes. First, it allows the article so formed to have hollow interior portions which correspond to weight and material savings. Second, the pressurized fluid within the mold cavity applies outward pressure to force the plastic against the mold surfaces while the article solidifies. Third, the cycle time is reduced as the gas migrates through the most fluent inner volume of the plastic and replaces the plastic in these areas which would otherwise require an extended cooling cycle. Fourth, the gas pressure pushes the plastic against the mold surfaces, thereby obtaining the maximum coolant effect from the mold.

However, as the dimensions of the molded article increase, the gas must do more work to migrate through the volume of the mold cavity to assist in setting up the article within the cavity If the pressure of the gas is too great as it enters the mold cavity, there is a risk that it may rupture or blow out the plastic within the mold cavity, i.e., the gas is not contained within the plastic. Thus, there have been practical limitations in the adaptation of gas injection in the plastic molding field.

DISCLOSURE OF THE INVENTION

One aspect of the present invention is a method for injection molding hollow plastic articles with pressurized gas which provides for displacement by the gas of a portion of plastic from the mold cavity into a flow coupled spill cavity. This feature enables plastic articles of relatively greater dimensions to be successfully molded with the advantages of established gas injection molding techniques.

More specifically, the process involves the initial injection of a quantity of fluent plastic into a mold cavity having a shape defining at least a portion of the plastic article to be molded. At or near the completion of the plastic injection, a charge of pressurized gas is introduced into the mold cavity to displace a portion of the still fluent plastic. The displaced plastic flows through a passage from the mold cavity into a connected spill cavity or reservoir. The reservoir may alternatively serve as: (i) an appendage of the complete article; (ii) a separate article; or (iii) a cavity to receive spilled plastic for regrinding. The plastic which is displaced is generally the hottest and most fluent. In this regard, the introduction of the charge of pressurized gas into the mold cavity can be timed to modulate the amount of plastic displaced, i.e., the longer the delay in introduction, the cooler and less fluent the plastic in the mold cavity.

In another feature of the invention, the hollow plastic article may be formed with an integral internal wall by introduction of two or more charges of pressurized gas. Each gas charge tends to form a cell within the article, and the cells are divided by membranes which serve as integral internal walls to enhance the structural properties of the article.

In yet still another feature of the inventing, venting of the gas from the mold cavity is accomplished by moving a support mechanism for a portion of the solidified injected plastic to allow the gas to burst through the unsupported plastic portion at the reservoir, the runner or an inconspicuous part of the article itself.

The present invention admits to molding of relatively large size structural articles for use in diverse product fields, such as a box-sectioned frame member for an automobile or refrigerator door or the hood of a car having a reenforcing beam.

Other advantages and features of the present invention will be made apparent in connection with the following description of the best mode for carrying out the invention.

BEST MODE FOR CARRYING OUT THE INVENTION

Figure 1:
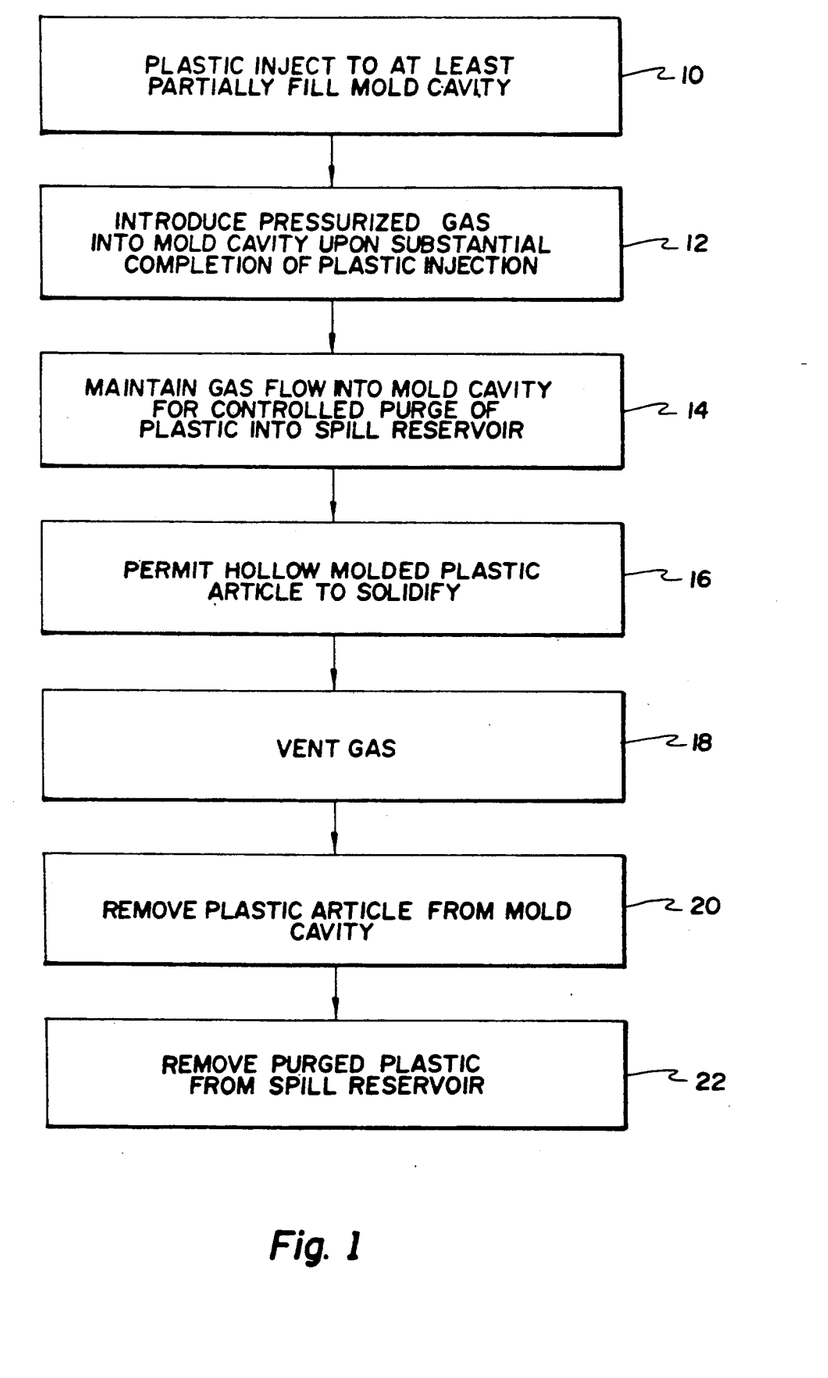
FIG. 1 is a flow chart indicating the basic steps involved in practice of the process of the present invention.

FIG. 1 is a flow chart of the steps involved in practicing the process of the present invention.

In step 10, a quantity of molten plastic is injected from an injection molding machine into a mold cavity. The plastic is any thermoplastic and works particularly well with glass or mineral filled thermoplastic polyester, commonly known by the trademark VALOX of General Electric Co. The quantity is sufficient to provide the mass of the article to be molded, but desirably less than the quantity which would fill the mold cavity.

In step 12, a charge of pressurized gas is introduced into the mold upon substantial completion of the injection of the quantity of molten plastic.

In step 14, the gas flow into the mold is maintained in pressure and duration in amount and time sufficient to displace a controlled quantity of plastic from the mold cavity into a spill cavity which is flow coupled to the mold cavity. The gas tends to displace the hottest, most fluent plastic in the central portion of the mold cavity. Consequently, the molded plastic article has a hollow interior where the least viscous plastic has been displaced. The presence of the gas affords savings in weight and material usage. Added benefits include enhanced surface quality due to the outward pressure exerted by the gas, and reduced cycle time due to displacement of the relatively hot plastic from the central portion of the article.

In step 16, the article is permitted to solidify within the mold cavity while the internal gas pressure is maintained.

In step 18, the pressurized gas is vented from the interior of the molded article preparatory to opening the mold. Numerous ways of venting are possible such as described in the Friederich U.S. Pat. No. 4,101,617 or as described in co-pending patent application Ser. No. 071,363 now U.S. Pat. No. 4,781,554 noted above.

In step 20, the plastic article is removed from the mold.

In step 22, the purged or displaced plastic is removed from the spill cavity or reservoir. In certain cases, steps 20 and 22 can be the common operation of ejecting the moldings so formed from the article cavity and the spill cavity.

Figure 2:
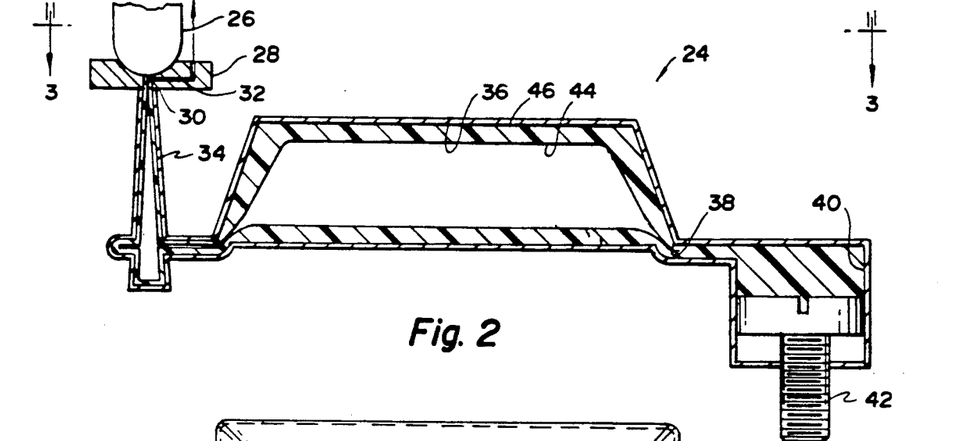
FIG. 2 is a schematic side view of a plastic injection molding apparatus adapted to carry out the process of the present invention.
Figure 3:
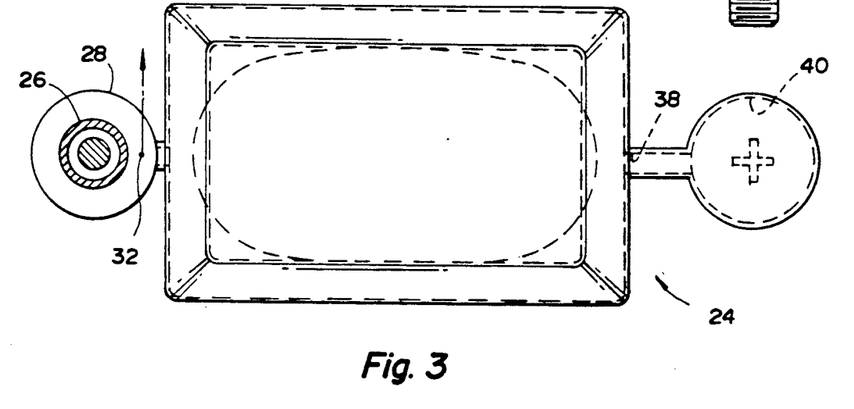
FIG. 3 is a top plan view of the apparatus of FIG. 2.

FIGS. 2 and 3 are schematic side and plan views, respectively, of a plastic injection molding apparatus, generally indicated at 24, adapted to carry out the process of the present invention.

A nozzle 26 of a plastic injection molding machine is brought into registering position with a modified sprue bushing 28 associated with a mold. The sprue bushing 28 may be of the type disclosed in the above-noted co-pending application Ser. No. 098,862, filed Sept. 21, 1987 now U.S. Pat. No. 4,855,094. The sprue bushing 28 has a plastic flow path 30 formed at its center to permit the passage of molten plastic through a sprue 34 into a mold cavity 36.

The modified sprue bushing also includes a gas path 32 to permit the introduction and venting of a charge of pressurized gas.

The mold cavity 36 is flow coupled through a runner segment 38 to a spill cavity 40. The volume of the spill cavity 40 may be varied by any well-known means to control the quantity of displaced plastic such as by a lead screw 42.

A molded article 46 produced by the process described in reference to FIG. 1 includes an interior void 44 formed by the presence and influence of the pressurized gas. The spill cavity 40 may be formed to mold an integral appendage of the article 46, or a separate article, or simply scrap for regrinding.

Figure 4:
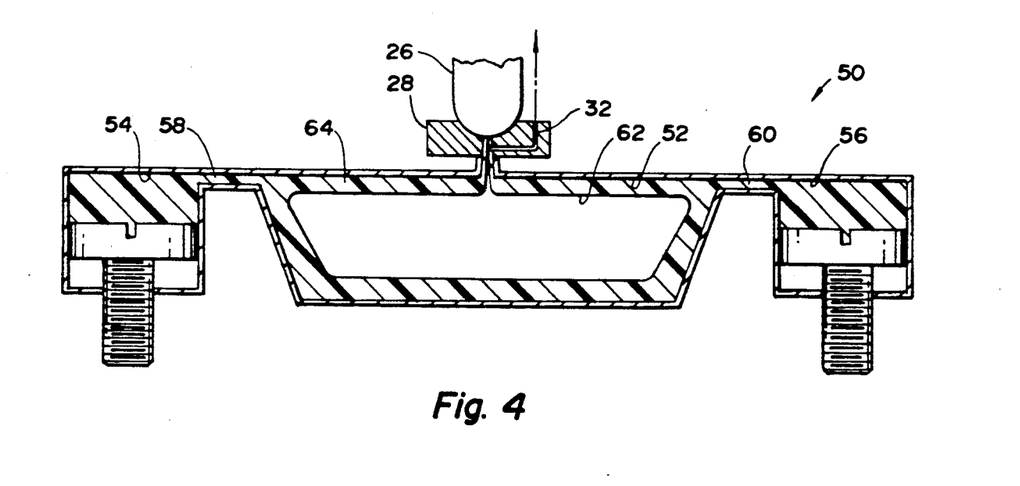
FIG. 4 is another schematic view of a plastic injection molding apparatus illustrating an alternative arrangement for practicing the process of the present invention.

FIG. 4 is another schematic view of a plastic injection molding apparatus, generally indicated at 50, illustrating an alternative arrangement for practicing the process of the present invention. In this case, the apparatus 50 employs first and second spill cavities 54 and 56 which are flow coupled through runners 58 and 60, respectively, to a mold volume 52. Again, a nozzle 26 from an injection molding machine registers with the sprue bushing 28 to inject a quantity of molten plastic into the mold cavity. A charge of pressurized gas flows along the gas path 32 in the modified sprue bushing 28 and into the cavity 52 to displace the least viscous plastic from the mold cavity 52 into the first and second spill cavities 54 and 56. This process, when performed in accordance with the steps of FIG. 1, will yield a molded article 64 having a central void 62 due to the displacement of plastic by the pressurized gas.

Figure 5:
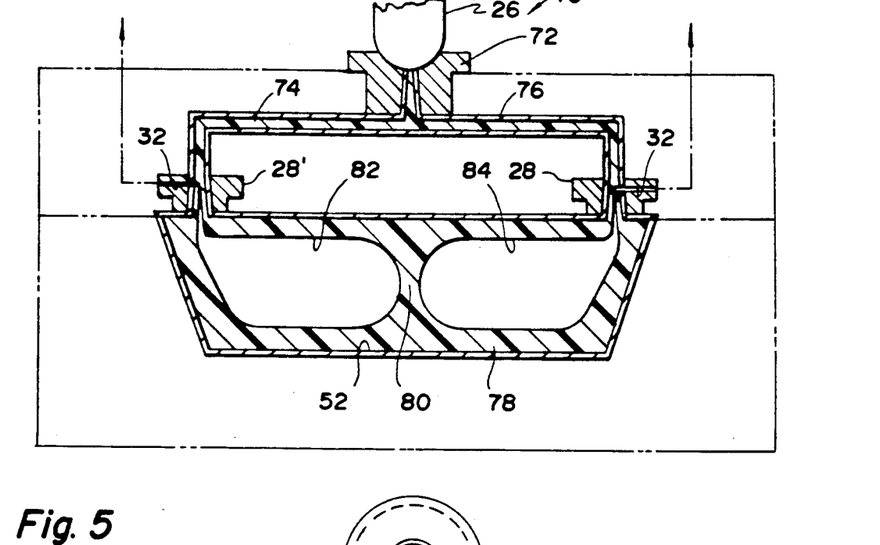
FIG. 5 is a side schematic view in cross-section showing still another plastic injection molding apparatus adapted to mold a hollow plastic article having an integral internal wall in accordance with the process of the present invention.
Figure 6:
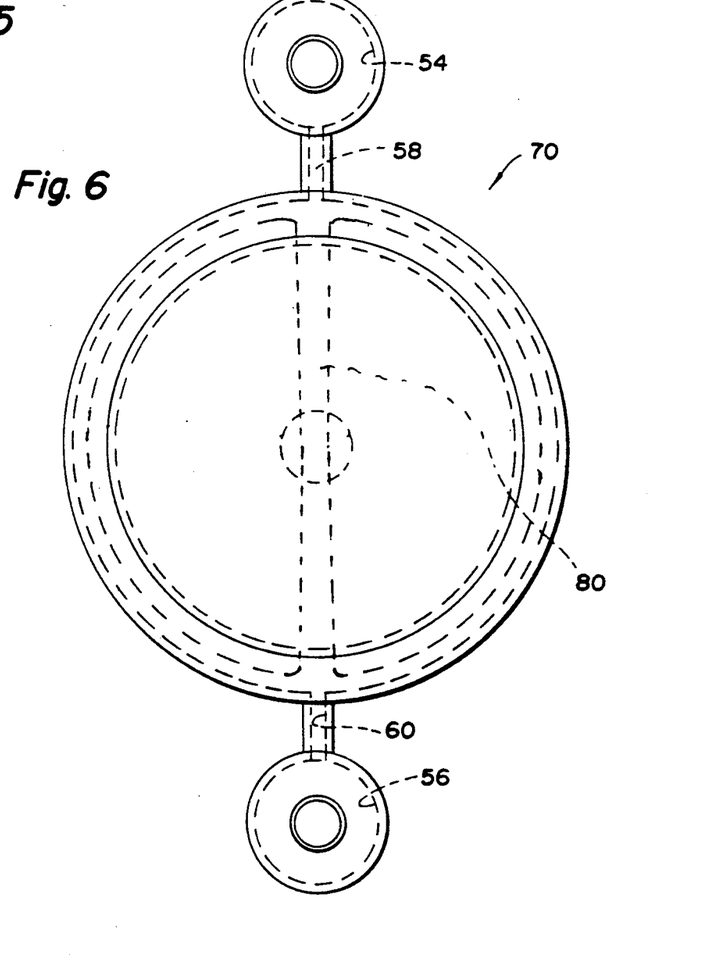
FIG. 6 is a plan view of the apparatus shown schematically in FIG. 5.

FIGS. 5 and 6 are side and plan schematic views, respectively, of still another plastic injection molding apparatus, generally indicated at 70, adapted to mold a hollow plastic article 78 having an integral internal wall 80. In this case, the injection molding machine nozzle 26 aligns with a sprue 72 which divides into a pair of runners 74 and 76. Each of the runners 74 and 76 connects to a bushing 28', which is modified from the sprue bushing 28 of FIG. 1 only to the extent required to remove it to the ends of the runners 74 and 76. In this example, the pair of bushings 28' are situated at opposite lateral extremes of the mold cavity 52 to produce a molded article 78 with an integral internal wall 80 at the center. The positioning of the bushings 28', as defining the gas entry points, will determine the resulting position of the integral internal wall 80.

In the apparatus 70 of FIGS. 5 and 6, the gas charges introduced through the paths 32 in the bushings 28' are simultaneous. Each gas charge tends to form a cell, as shown by voids 82 and 84, within the article 78. The cells are divided by a membrane which serves an integral internal wall 80.

In other respects the apparatus 70 of FIGS. 5 and 6 is essentially similar to the apparatus 50 of FIG. 4. Specifically, the apparatus 70 likewise employs first and second spill cavities 54 and 56 flow coupled to the mold cavity 52 through runners 58 and 60, respectively.

Figures 7, 8:
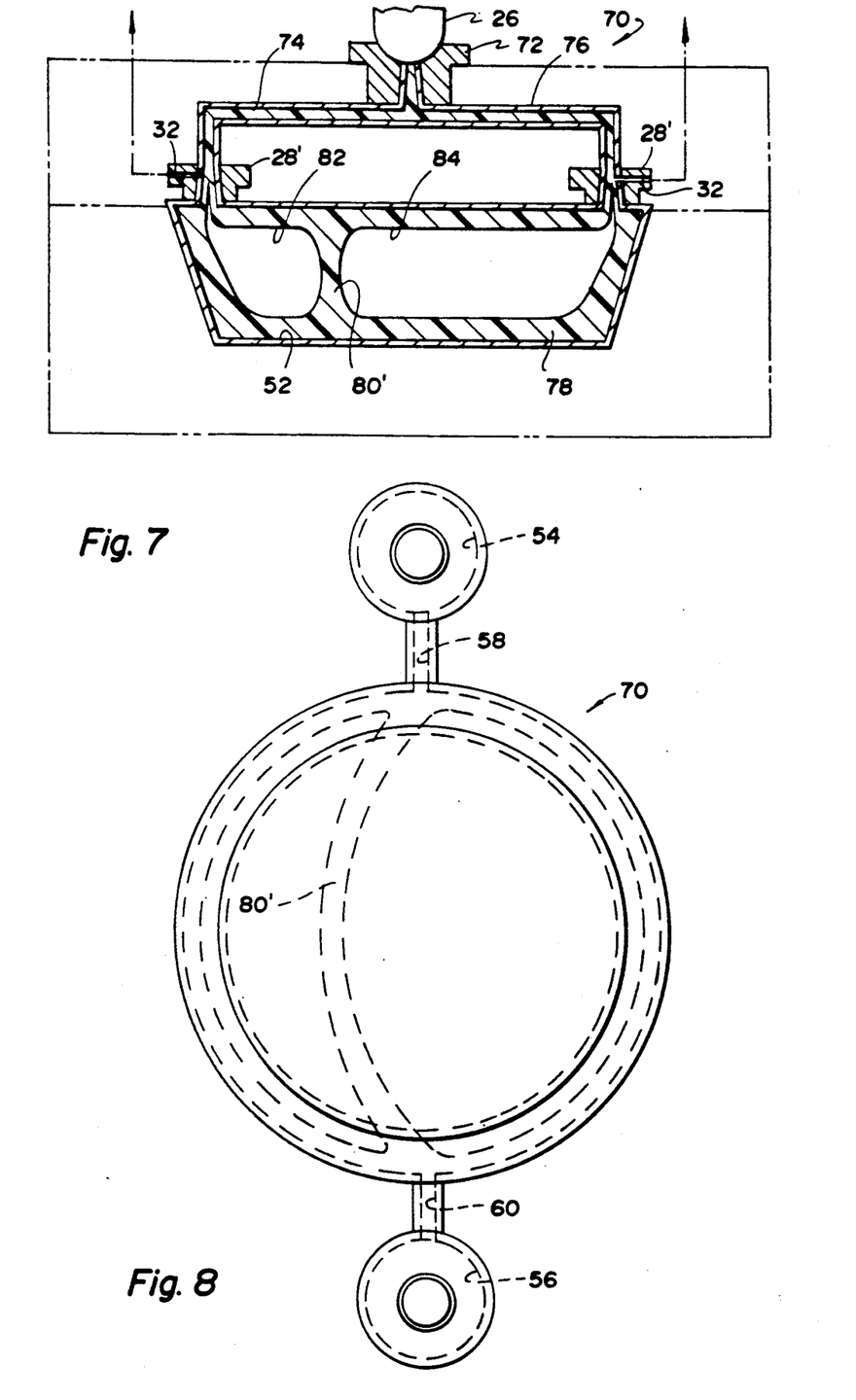
FIG. 7 is a view similar to FIG. 5 wherein the internal wall is displaced from the central location of FIG. 5.
FIG. 8 is a plan view of the apparatus of FIG. 7.

In the apparatus 70 of FIGS. 7 and 8, the gas charges introduced through the paths 32 in the bushings 28' are sequential so that the membrane which serves as an integral wall 80' is displaced to one side. For example, the interval between the gas charges may be between 0.25 and 1.0 seconds apart.

Figures 9, 10, 11, 12A, 12B:
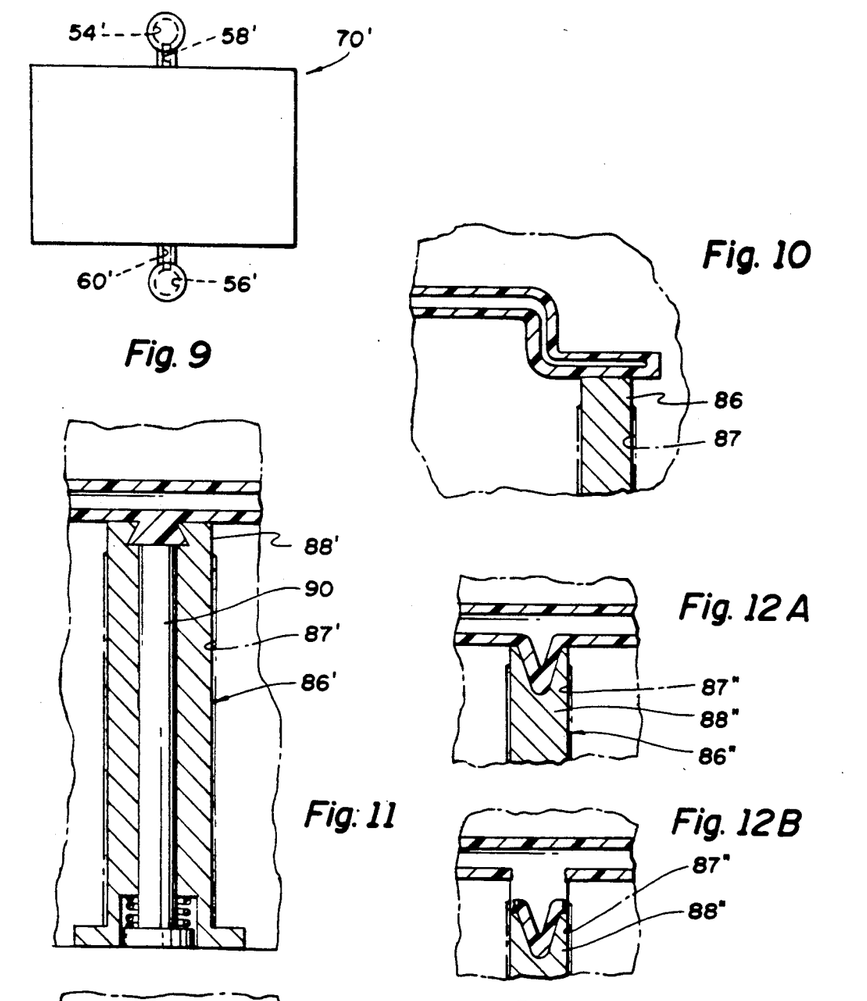
FIG. 9 is a plan view of yet still another plastic injection molding apparatus.
FIG. 10 is an enlarged side schematic view of the apparatus of FIG. 9, partially broken away and illustrating one embodiment of a venting step.
FIG. 11 is a view similar to FIG. 10 illustrating a second embodiment of the venting step.
FIG. 12A is a view similar to FIG. 10 illustrating a third embodiment of the venting step.
FIG. 12B is a view of the third embodiment after venting.

FIGS. 9 and 10 are plan and side schematic views, respectively, of another plastic injection molding apparatus, generally indicated at 70', adapted to mold a hollow plastic article. The apparatus 70' employs spill cavities 54' and 56' coupled to the mold cavity through runners 58' and 60', respectively.

The plastic in at least one of the spill cavities 54' and 56' is supported during plastic solidification by a movable mold part such as a pin 86 supported within the mold of the apparatus 70'. The gas is vented by moving the pin away from the supported plastic prior to opening the mold to the atmosphere so that the pressurized gas bursts through the now unsupported plastic within the spill cavity. The gas then travels around the pin 86, through the mold and to the atmosphere in a controlled fashion. The pin 86 may be moved relative to the mold in any well-known fashion and is supported in a bore 87 in the mold leaving approximately 0.005 inches clearance around the pin 86 to permit the gas to travel around the pin 86.

Figure 13A:
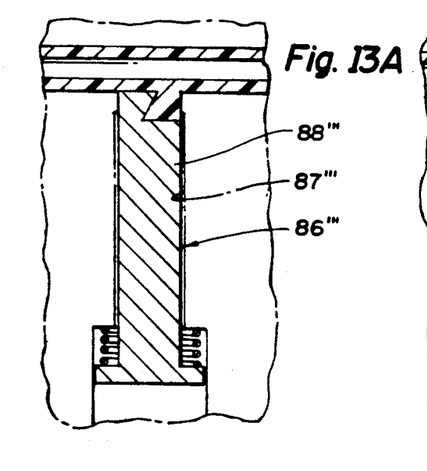
FIG. 13A is a view similar to FIG. 10 illustrating a fourth embodiment of the venting step.
Figure 13B:
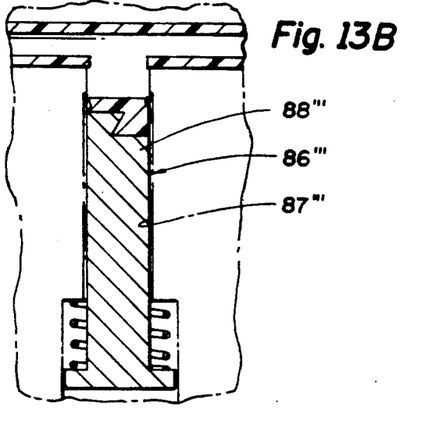
FIG. 13B is a view of the fourth embodiment after venting.

FIGS. 11, 12A and 13B show alternate embodiments of a pin, generally indicated at 86', 86" and 86"', respectively, for venting the gas from the article. FIGS. 12B and 13B show the pins 86" and 86"' in their venting positions, respectively. Each of the pins 86', 86" and 86"' include an angled end portion 88', 88" and 88"', respectively, for receiving and retaining a portion of the solidified injected plastic therein at a plastic reservoir, a runner segment, a sprue portion or an inconspicuous part of the article itself. Movement of the pins 86', 86" and 86"' away from their respective supported portions of injected plastic causes their respective end portions 88', 88" and 88"' to carry a portion of plastic therewith to facilitate the venting step, as illustrated in FIGS. 12B and 13B.

In the embodiment of FIG. 11, the pin 86' includes a central ejector 90 which can be operated in any well-known fashion to subsequently eject the solidified plastic from the end portion 88' after venting and prior to the next cycle.

The invention has been described in illustrative embodiments, but it will be evident to those skilled in the art that variations may be made from the foregoing teachings without departing from the scope of the following claims.

What is claimed is:

1. A process for injection molding a hollow plastic article comprising the steps of:
    injecting a quantity of fluent plastic into a mold cavity having a shape defining at least a portion of the article;
    displacing a portion of the plastic from the mold cavity into a spill cavity flow coupled to the mold cavity by introduction of a charge of pressurized gas into the mold cavity;
    permitting the injected plastic to solidify;
    venting the gas from the mold cavity; and
    removing the plastic article from the mold.

2. A process for injection molding a hollow plastic article having an integral internal wall comprising the steps of:
    injecting a quantity of fluent plastic into a mold cavity having a shape defining at least a portion of the article;
    introducing first and second charges of gas into the mold cavity at spaced locations and at pressures sufficient to displace quantities of plastic into oppositely disposed spill cavities flow coupled to the mold cavity;
    permitting the injected plastic to solidify;
    venting the gas from the mold cavity; and
    removing the plastic article from the mold.

3. The invention as claimed in claim 2 wherein the first and second charges of gas are introduced into the mold cavity substantially simultaneously.

4. The invention as claimed in claim 2 wherein the first and second charges of gas are introduced into the mold cavity in a predetermined sequence.

5. A process for injection molding a hollow plastic article including the steps of injecting a quantity of fluent plastic into a mold cavity of a mold having a shape defining at least a portion of the article, introduction of a charge of pressurized gas into the mold cavity upon substantial completion of plastic injection, permitting the injected plastic to solidify by supporting the injected plastic in the mold, venting the gas from the mold cavity, and removing the plastic article from the mold, wherein the improvement comprises: a portion of the injected plastic is supported within the mold by a movable support means of the mold during plastic solidification and wherein the step of venting is accomplished by moving the support means to a non-support position to allow the gas to burst through the thereby unsupported plastic portion.

6. The process as claimed in claim 5 wherein the support means includes an angled end portion for receiving and retaining the portion of the injected plastic therein and wherein movement of the support towards the non-support position removes the portion of the injected plastic from the rest of the injected plastic.

7. The process as claimed in claim 5 wherein the mold has a spill cavity coupled to the mold cavity and wherein the portion of the injected plastic is located in the spill cavity.

8. The process as claimed in claim 6 wherein the mold has a runner segment coupled to the mold cavity and wherein the portion of the injected plastic is located in the runner segment.

9. The process as claimed in claim 6 wherein the support means includes a movable pin having extended and retracted positions for removing the portion of the injected plastic from the angled end portion in the extended position of the pin.

* * * * *

(12) EX PARTE REEXAMINATION CERTIFICATE (6566th)
United States Patent
Hendry (10) Number: US 5,098,637 C1
(45) Certificate Issued: Dec. 16, 2008

(54) PROCESS FOR INJECTION MOLDING AND HOLLOW PLASTIC ARTICLE PRODUCED THEREBY

(75) Inventor: James W. Hendry, Brooksville, FL (US)

(73) Assignee: Melea Limited, Southfield, MI (US)

Reexamination Request:
No. 90/006,893, Dec. 22, 2003

Reexamination Certificate for:
Patent No.: 5,098,637
Issued: Mar. 24, 1992
Appl. No.: 07/217,175
Filed: Jul. 11, 1988

(51) Int. Cl.
*B29C 33/00* (2006.01)
*B29C 45/17* (2006.01)

(52) U.S. Cl. .............. 264/328.12; 264/328.13; 264/328.7; 264/328.8

(58) Field of Classification Search .............. None
See application file for complete search history.

(56) References Cited

U.S. PATENT DOCUMENTS

| | | | |
|---|---|---|---|
| 3,044,118 A | | 7/1962 | Bernhardt et al. .............. 18/26 |
| 4,140,672 A | * | 2/1979 | Kataoka ..................... 264/45.1 |
| 4,740,150 A | | 4/1988 | Sayer ......................... 425/542 |
| 5,069,859 A | | 12/1991 | Loren ......................... 264/572 |
| 5,204,051 A | * | 4/1993 | Jaroschek ..................... 264/572 |
| 5,997,799 A | * | 12/1999 | Driessen et al. ............. 264/572 |

FOREIGN PATENT DOCUMENTS

| | | |
|---|---|---|
| EP | 0424435 B1 * | 7/2001 |
| FR | 1145441 | 10/1957 |
| GB | 2139548 | 11/1984 |
| JP | SHO48-122861 | 6/1975 |

OTHER PUBLICATIONS

Modern Plastics encyclopedia, 1988, McGraw–Hill, Inc. pp. 252–253 and 258.*
Plastic Engineering Handbook of the Society of the Plastics Industry, Inc., 1976 Van Nostrand Reinhold Company, pages 131 and 606.*
CGI "Cinpres Gas Injection" Press Release entitled Melea's European 'Overflow' Patent Revoked, Oct. 2, 2003.*
Plastic News entitled "Cinpres Wins Latest Battle in Patent Wars", Oct. 6, 2002, vol. 15, Issue 32.*

* cited by examiner

*Primary Examiner*—Stephen J Stein (57) ABSTRACT

A process for injection molding hollow plastic articles includes the steps of sequentially injecting fluent plastic and gas into a mold cavity. A quantity of fluent plastic is initially injected to substantially fill the mold cavity. A charge of pressurized gas is then injected into the mold cavity to displace a portion of the still fluent plastic into a spill cavity flow coupled to the mold cavity. The article may be formed with an internal wall by introducing first and second gas charges into the mold cavity at separate entry points. In on embodiment, the first and second charges are introduced substantially simultaneously. In a second embodiment, the charges are introduced sequentially. After the hollow plastic article has solidified, the gas is vented.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 2–9 is confirmed.

Claim 1 is cancelled.

\* \* \* \* \*